Aug. 7, 1934.  A. R. DOBBS  1,968,811

TIRE CHAIN

Filed April 24, 1931

INVENTOR
Albert R. Dobbs.
BY
Barnes, Dickey, Pierce & Hann.
ATTORNEYS.

Patented Aug. 7, 1934

1,968,811

UNITED STATES PATENT OFFICE 1,968,811

TIRE CHAIN

Albert R. Dobbs, East Detroit, Mich.

Application April 24, 1931, Serial No. 532,568

4 Claims. (Cl. 152—14)

This invention relates to tire chains and particularly to chains for tires which are constructed in such manner as to have the cross links thereof supported in diagonal relation to the supporting element therefor. The diagonal position of the cross members, when disposed in opposite relation on tires on different sides of the car, not only provide traction for driving and braking the car but also prevent the skidding of the car in either side from the direction in which it is moving.

The main objects of my invention are; to provide a chain for a tire having cross members disposed in parallel relation to each other in diagonal relation to the supporting members; to provide traction for driving and braking the car and for preventing the skidding of the car in either direction; to provide cross members for a tire chain which engage the side members thereof in such manner as to prevent the shifting of the side members to change the diagonal relation of the cross members; to provide a plurality of laterally rigid cross links for a tire chain which are twisted to normally assume a position diagonally to the supporting members therefor.

Figure 1:
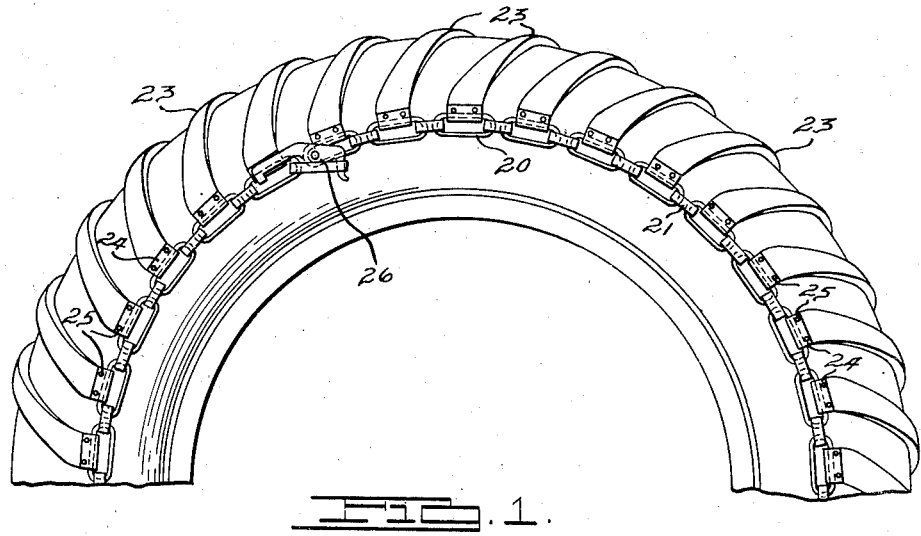
Figure 2:
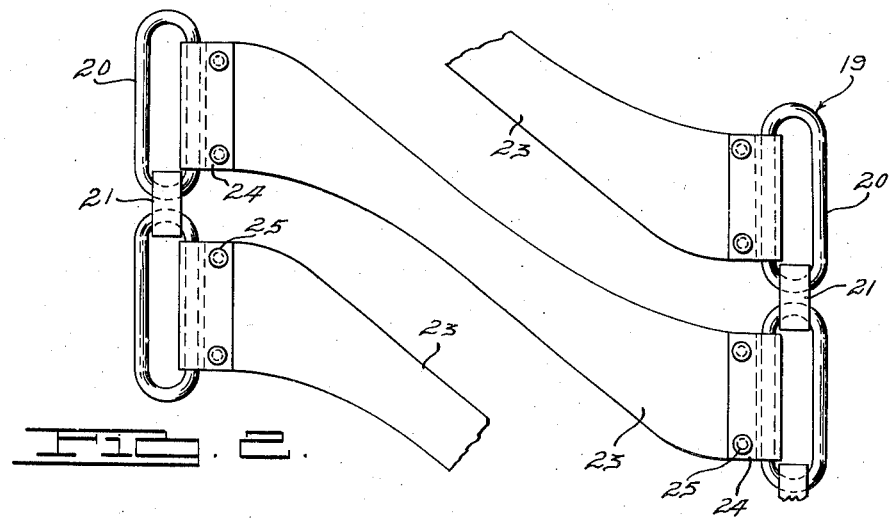
Figure 3:
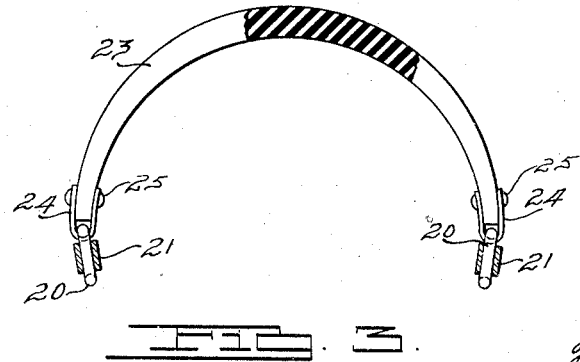

Other objects and features of novelty of my invention will be either specifically pointed out or will become apparent when referring, for a better understanding of my invention, to the following description in conjunction with the accompanying drawing, wherein:

Figure 1 is a broken view, in elevation, of a tire provided with a chain embodying features of my invention, Fig. 2 is an enlarged broken plan view of the tire chain illustrated in Fig. 1, when disposed in a horizontal plane, and Fig. 3 is a view in elevation of a link shown in Fig. 2 illustrating the position it assumes when formed about a tire.

Various attempts have been made heretofore to construct tire chains which will prevent the car from skidding when the cross members of the chain provide the traction for braking purposes. The links have been constructed in the form of the letter X, longitudinal linking elements have been employed with the cross links and other expedients have been utilized for preventing the skidding of the car when traction is supplied by the tire chain. While these types of cross links may have been beneficial for reducing the skidding over that effected when cross links were provided which were disposed normal to the supporting members, I have found that cross links which are disposed diagonally across the tire surface, are more reliable than any of the known types for preventing skidding. The cross members may be made of fabricated materials or may consist of a plurality of links or a single metal member which are united to flexible longitudinal supporting members in such manner that the cross members are retained in diagonal position at all times when mounted on a tire.

Referring to Figs. 1, 2 and 3 of the drawing, I have illustrated a tire chain which includes two longitudinally extending supporting members 19 having a plurality of elongated links 20 connected together by collars 21 of a width substantially equal to the width of the space between the sides of the links 20. A plurality of cross members 23 are constructed from a woven rubberized or similar material and shaped diagonally across the central body portion and outwardly therefrom and shaped to provide ends which are disposed in parallel relation to the links 20. The central portions of the cross members 23 are twice as thick as that of the end portions which are twice the width of the central portion, the thickness and width tapering therebetween to substantially provide a uniform cross sectional area throughout the length of the cross members.

Clips 24 encompass one side of the links 20 throughout substantially the entire length thereof and engage the top and bottom surfaces of the end of the cross members when supported in fixed position thereon by rivets 25 or similar supporting members. When a tire chain is built up in this manner the links 23 are disposed diagonally to the longitudinally extending portion 19 thereof and sufficient rigidity is provided by the clips 24 and the collars 21 to prevent the links 20 from buckling or sliding relative to each other and to thereby retain the cross members 23 in the diagonal position illustrated in the figures. Suitable releasable clamping members 26 are provided on each of the longitudinally extending members 19 for uniting the ends of the members and for tightly clamping the chain to the tire in the conventional manner.

A set of tire chains constructed in this manner are preferably mounted on the tire with the cross links 23 thereof disposed in opposite directions to each other to have the cross links on one tire and the cross links of an opposite tire disposed in herringbone relation to each other. In this arrangement the cross links on one side prevents the car from skidding in that direction while the cross link on the other side prevents the car from skidding in the other direction. The angular disposition of the cross links may be from the inside forwardly to the outside or from the outside forwardly to the inside and tests seem to indicate that the latter arrangement of the links effected the most reliable results, that of providing traction for effecting the braking of the car and for preventing the skidding of the car when the brakes are applied.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A tire chain including, in combination, longitudinally extending members, a plurality of flexible cross members therefor having central portions disposed in diagonal relation to the ends thereof in continuation of said central portion and means engaging the extending members and attached to the end portions of said cross members for retaining the central portions of said cross members in diagonal relation to said extending members.

2. A tire chain including, in combination, longitudinally extending members comprising elongated links and relatively shorter collars interconnected with each other, a plurality of cross members having the side edges of the end portions thereof disposed diagonally to the edges of the central portions thereof, and link engaging members supported on the diagonally disposed ends of said cross members for retaining said central portions of the cross members in diagonal relation to said extending members.

3. A cross link for a tire chain varying in width and thickness from the central to the end portions thereof to provide a substantially uniform cross-sectional area throughout the length of the link.

4. A link made of a flexible material having different dimensions in width and thickness at the central and end portions thereof so proportioned as to provide a substantially uniform cross-sectional area throughout the length of the link.

ALBERT R. DOBBS.